March 8, 1932.  E. J. BARTELS ET AL  1,848,599

PROCESS FOR CONSTRUCTING HEAVY METAL OBJECTS

Filed July 15, 1929

Inventors
Edwin J. Bartels
Carl Bartels
By Murray & Zugelter
Attorneys

Patented Mar. 8, 1932

1,848,599

UNITED STATES PATENT OFFICE

EDWIN J. BARTELS AND CARL BARTELS, OF HAMILTON, OHIO, ASSIGNORS TO THE MOSLER SAFE COMPANY, OF HAMILTON, OHIO, A CORPORATION OF NEW YORK

PROCESS FOR CONSTRUCTING HEAVY METAL OBJECTS

Application filed July 15, 1929. Serial No. 378,350.

An object of the invention is a process for making case-hardened safes from rolled metal plates without cracking them at the joints between the plates.

Another object of the invention is to provide a process of construction by which any structural weakening as a result of the case-hardening process normally used in the manufacture of articles of the class described, is obviated.

It has been customary to manufacture safes, and the like, by casting them, thus forming the sides, ends, top and bottom integral. It is well known, however, that cast metal does not possess the same strength as metal sheets or plates which have been rolled and subjected to other hardening processes. Consequently, it has been attempted to construct safes of such plates, by means of welding the plates together through the medium of fusing metal applied at the joints. But the case-hardening of safes so constructed has resulted in cracking at the joints due to the difference in contraction and expansion of the fusing metal and the metal forming the plates.

The present invention overcomes this difficulty by means of direct welding, that is, of welding plates together without the use of a fusing metal or material, thus making practicable the construction of safes from metal plates of superior strength and durability.

Figure 1:
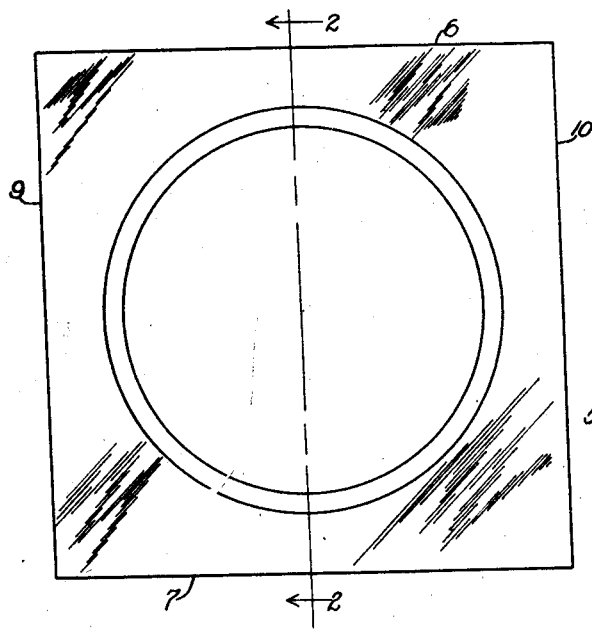
Fig. 1 is a front elevational view of a safe of common design.
Figure 2:
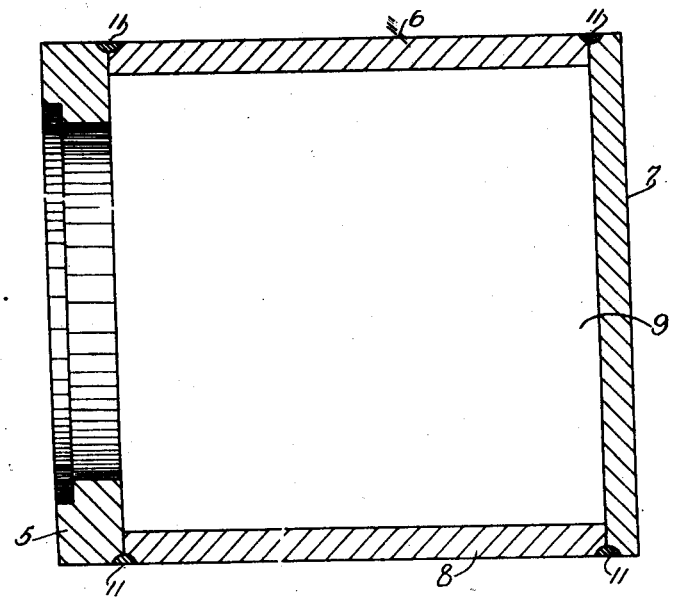
Fig. 2 is a view taken on line 2—2 of Fig. 1 and showing an adaptation of the means of this invention.

The safe illustrated has the front 5, top 6, rear 7, bottom 8, and sides 9 and 10, each formed of a suitable metal plate, for example, box plate of open-hearth steel. These parts, before assembly, have their edges planed square, and are then clamped into their proper relative positions, with the plane-squared ends or edges of the plates contacting the flat inner faces of the adjacent members. With reference to the drawing, the ends of top 6 and bottom 8 contact the inner faces of front 5 and rear 7 adjacent the top and bottom edge of the latter, and the ends of sides 9 and 10 abut the inner faces of front 5 and rear 7 adjacent the side edges thereof. After the parts have been thus clamped into position a carbon arc weld is applied along the joints, the welding being allowed to penetrate approximately one-half inch inwardly of the outer faces of the plates. A welding rate of fifteen inches per minute has been found to result in the stated depth of penetration of the welding. In Fig. 2 the welding is denoted by the small areas enclosed by arc lines and designated by numeral 11. After the welding process has been completed, the safe is heated to the temperature commonly used in case hardening, that is, about 1800 degrees F., subsequent to which heating, the safe is immersed in cold water of a temperature suitable for the purpose. No cracking at the joints results from the case hardening process, due to the fact that no intermediate fusing metal, of a density different than that of the plates, has been used.

The safe thus constructed has the advantage of being substantially integral in its parts, and at the same time, possesses strength far beyond that of the ordinary cast safe. Moreover, the processes of its manufacture are less involved than those required in the production of cast safes.

What is claimed is:

The process of constructing metal safes from plates, said process consisting in clamping plates into proper relationship, welding the plates together with an arc weld employed without the use of a fusing material, heating the welded article to a temperature suitable for case hardening, and immersing the heated article in cold water.

In testimony whereof, we have hereunto subscribed our names this 5 day of July, 1929.

EDWIN J. BARTELS.
CARL BARTELS.